United States Patent [19]

von Haas

[11] Patent Number: 4,748,879
[45] Date of Patent: Jun. 7, 1988

[54] TOOL COUPLING

[75] Inventor: Rainer von Haas, Geesthacht, Fed. Rep. of Germany

[73] Assignee: Fried. Krupp Gesellschaft mit beschränkter Haftung, Essen, Fed. Rep. of Germany

[21] Appl. No.: 907,084

[22] Filed: Sep. 12, 1986

[30] Foreign Application Priority Data

Sep. 14, 1985 [DE] Fed. Rep. of Germany ....... 3532891

[51] Int. Cl.⁴ .............................................. B23B 29/20
[52] U.S. Cl. ..................................... 82/36 B; 409/234
[58] Field of Search ...................... 279/1 L, 1 Q, 32, 8, 279/76, 80; 408/238, 239 R, 239 A, 714; 409/230, 231, 232, 233, 234; 82/36 B

[56] References Cited

U.S. PATENT DOCUMENTS 4,621,960 11/1986 Tollner ............................... 409/234

FOREIGN PATENT DOCUMENTS 3225173 4/1984 Fed. Rep. of Germany .
3314591 10/1984 Fed. Rep. of Germany .
500920 3/1986 U.S.S.R. ............................... 409/233

Primary Examiner—Z. R. Bilinsky
Attorney, Agent, or Firm—Spencer & Frank

[57] ABSTRACT

To produce a connection without play between the shaft or shank (3) of a tool head (1) and a corresponding bore (4) of a tool holder (2), the shank includes an abutment collar (5), an adjacent short conical portion (3a), a cylindrical pin portion (3b), and a guide portion (3c) at the end of the shank. The short conical portion adjacent the collar is slightly overdimensioned compared to a corresponding conical portion (4a) of the bore. When the shank is forced into the bore at least one of these parts is elastically deformed and the abutment of the shank comes into planar contact with an end face of the tool holder. The guide portion (3c) at the end of the shank may be either cylindrical or conical.

15 Claims, 4 Drawing Sheets

TOOL COUPLING

BACKGROUND OF THE INVENTION

The present invention relates to a tool coupling for connecting a tool head and a tool holder to provide security against rotation and axial distortion, with the tool head serving as a cutting tool and comprising a partially conical shank or shaft and an annular abutment collar and with the tool holder having a receptacle corresponding to the shank and having a corresponding abutment collar. Such couplings are required, in particular, for machine tools which are automatically attached and manipulated.

When tools are changed in automatic cutting machinery, tools having steep angle tapered shafts are received in a conical sleeve where they are axially tensioned. Steep angle tapered shafts for tools and cutting equipment are defined, for example, in German Standard DIN No. 2080. The steep angle taper has the advantage that its conical shape permits easy introduction into the corresponding receptacle and easy, correct positioning. On the other hand, however, there are drawbacks. The tools to be exchanged are rather large and heavy. Moreover, considerable cutting forces sometimes act on the tapered shaft at a right angle to the longitudinal axis of the tool, and these forces are insufficiently absorbed by the tool faces. An attempt has been made to overcome the lack of planar contact of such a coupling by providing better support for the tool head using a retaining means flange that is brought into contact with the frontal face of the tool holder. However, such a coupling requires precision manufacture because the connection is critical. If there is even a slight deviation, some play exists between the tapered shaft and the correspondingly shaped receiving sleeve if the flange is in contact, or the flange does not find its abutment if the tapered shaft and sleeve are seated on one another in a good fit.

German Pat. No. 3,225,173 already discloses a connecting device in which adapters are provided between the frontal face of a spindle and a rotating collar of the steep angle tapered shaft. These adapters are connected with a retaining means flange by means of holding screws and are supported at the frontal face. This produces planar contact as well as full support of the tapered shaft. However, because of the problem of manufacturing tolerances, this system cannot be employed for the automatic exchange of tools. In particular, such a coupling is impossible to use in practice if a variety of tools and tool holders are combined.

German Published Patent Application [without examination] No. 3,314,591 discloses a clamping system with planar contact. The system includes a short conical fitting section in which the conical sleeve of a tool holder and the pilot tapered shaft of a tool head are configured in such a way that the tapered shaft comes to bear only at the smallest portion of its diameter, while at the larger portion there is air in the area of the planar contact. Planar contact is allegedly assured in that either the conical taper or the conical sleeve deforms enough elastically in the region of their smallest diameters that planar contact is achieved. These clamping systems, however, do not prevent the tool from escaping to the side due to play at the larger diameter of the conical surfaces if there is a unilateral load, and thus the tool is limited in function and performance capability.

SUMMARY OF THE INVENTION

It is an object of the present invention to provide a coupling between a tool holder and a tool head which makes it possible, while avoiding the above-mentioned drawbacks, to manipulate and clamp the tool in automatically. In particular, the coupling assures a connection without play between the shank or shaft of the tool head and the corresponding receiving bore of the tool holder, and at the same time permits axially planar contact between the tool holder and the tool head. Moreover, the coupling permits easy introduction of the shank into the bore by means of automatic changing devices, with orientation being achieved by means of appropriate retaining means to fix the tool position.

This is accomplished by a tool coupling having a three-stage shank. Adjacent an abutment collar, the shank has a short conical portion which is followed by a cylindrical pin portion; at its end, the shank is terminated by a guide portion. The short conical portion adjacent the abutment collar is slightly overdimensioned with respect to a corresponding conical portion of the bore so that elastic deformation of at least one of these members, when the shank is forced into the bore, produces planar contact between tool head and tool holder.

The guide portion at the end of the shank may have a cylindrical shape, to provide a centering pin which engages a corresponding cylindrical portion of the bore of the tool holder with play within close tolerances. Alternately, the guide portion at the end of the shank may have a conical shape and likewise be elastically deformable. A guide portion that is conically shaped and elastically deformable should be slightly overdimensioned with respect to a corresponding conical part of the bore. The above-mentioned embodiments permit secure and accurate centering of the tool head in the tool holder. The planar faces which lie against one another at right angles to the longitudinal axis give the tool head accurate axial positioning, absorb all axial forces acting in the direction of the tool holder, and do not additionally act on the conical bore, so that the conical surfaces are relieved of stress. In particular, the short conical portion in the region of the largest diameters of the shank and the bore permits easy coupling of tool head to tool holder without having to maintain particularly close position tolerances.

According to one feature of the invention, if the guide portion at the end of the shank has a conical shape, the guide portion is fabricated so that it is elastically deformable and slightly overdimensioned with respect to the corresponding conical portion of the bore, with such overdimension being compensated during installation of the tool head in the tool holder to realize planar contact between tool head and tool holder. The overdimension lies preferably in a range of a few microns. The elastic deformability of the guide portion is preferably realized by an axial undercut at the end of the guide portion. The outer end of the bore or receptacle in the tool holder has a conical region which is also elastically deformable, thereby providing compensation of manufacturing tolerances between shank and bore and a coupling without play.

Preferably, the tool coupling is configured so that essentially only the outer conical portion of the bore and the guide portion at the end of the shank are elastically deformable. This configuration makes it possible, in particular, to give the tool the required rigidity. Two centering regions at the beginning and end of the shank provide an additional supporting effect which benefits, in particular, tools which project rather far.

For manufacturing reasons, the short conical portion adjacent the abutment collar of the shank, and the conical guide portion at the end of the shank, should have the same cone slope angle, which preferably lies between 1° and 10°.

In view of the easy axial clamping between the tool head and the tool holder, a centrally disposed differentially threaded screw which is aligned with the axis of the bore assures fast and secure tensioning via threads in the tool head and threads in the tool holder. During release, the differentially threaded screw pushes the tool head somewhat out of the bore.

Security against rotation is provided by at least one retaining means. There are advantageously two retaining means locations. On the one hand, it is possible to provide a retaining means in the form of a key which extends outward from the cylindrical pin portion of the shank and engages a corresponding keyway in the bore. On the other hand, one or more retaining means may be provided as radially extending locking formations provided at adjacent surfaces on the tool head and the tool holder. However, in providing security against rotation, one is in no way limited to indirectly conventional components. It is just as possible to provide security against rotation by way of a direct, polygonal connection between the tool head and the tool holder. A polygonal connection is, for example, a multiple tooth surface which may be provided wherever no conical or guide surfaces are available, for example at the region of the cylindrical pin portion of the shank.

In view of the fact that the bore or receptacle is often subjected to considerable wear, a further feature of the invention provides that the bore is not provided directly in the tool holder but at least partially within an exchangeable tool holder sleeve.

Finally, according to a further feature of the invention, the tool holder has an elastically deformable abutment or ring at the bottom of the receptacle or bore. Its essential function is to preliminarily position the tool head and prevent the tool head, after it has been inserted, from hitting the differentially threaded screw and damaging the thread.

DESCRIPTION OF THE PREFERRED EMBODIMENTS

Figure 1:
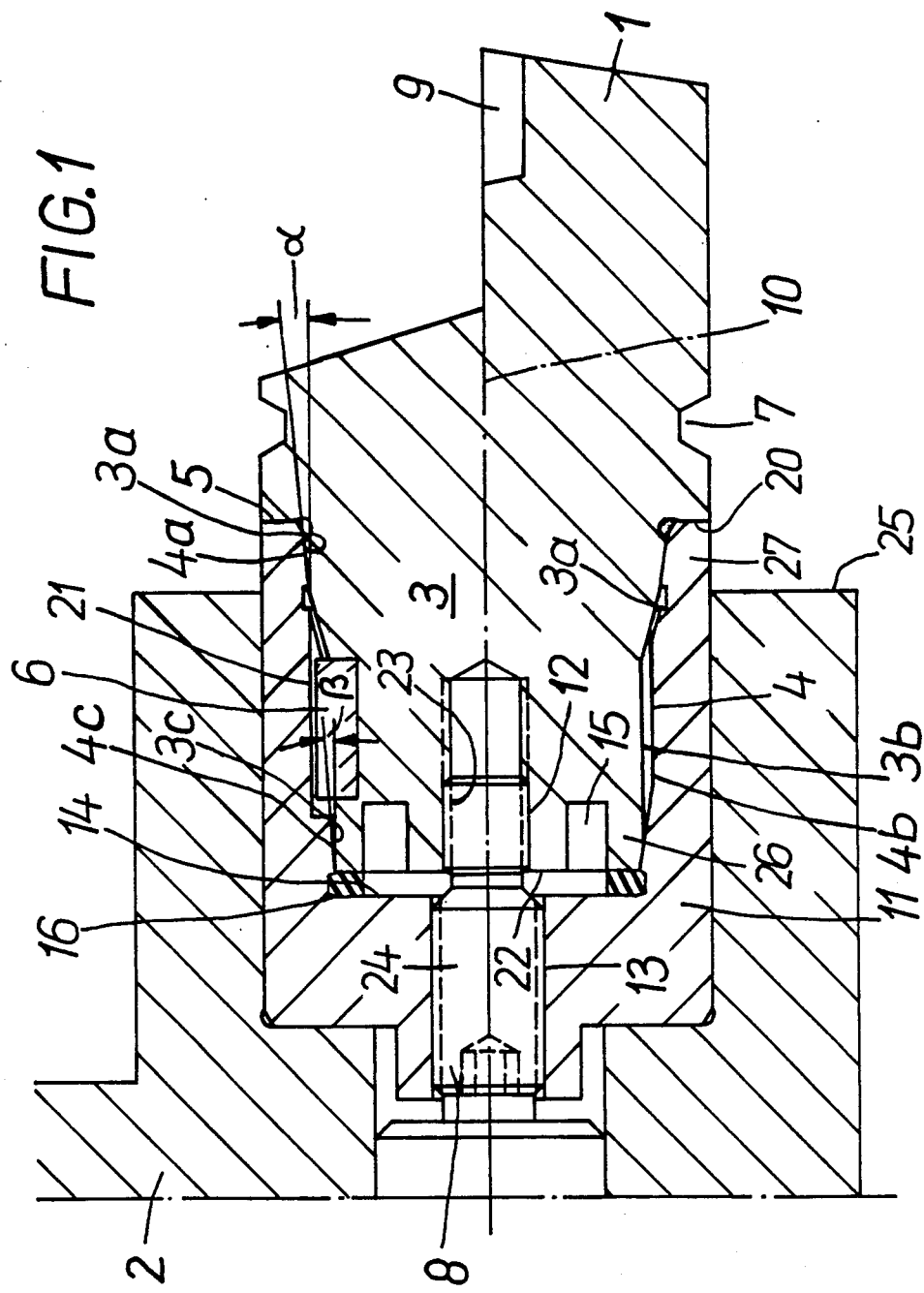
FIG. 1 is a cross-sectional view of tool head and a tool holder in the tensioned state, the tool head having a shank or shaft with two conical portions.
Figure 2:
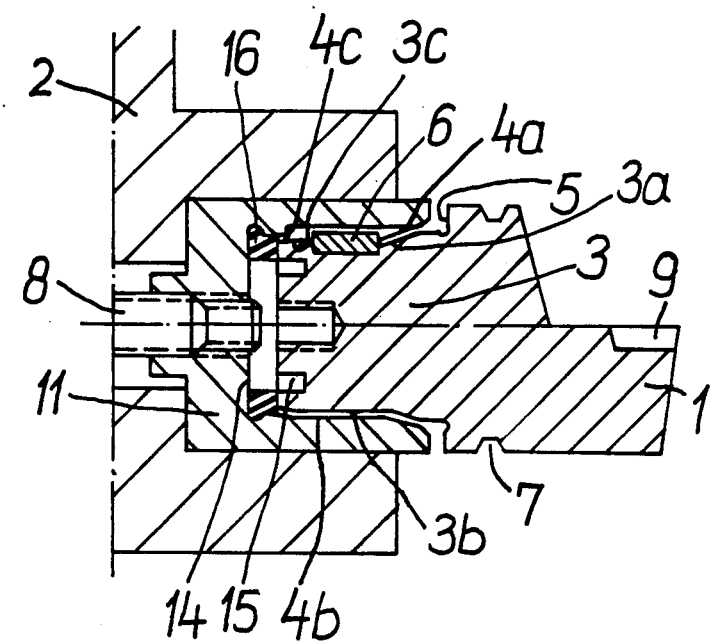
FIG. 2 is a cross-sectional view in which the tool head of FIG. 1 is in its released state.

In the embodiment of FIGS. 1 and 2, an essentially cylindrical tool head 1 has a shaft or shank 3 which is coaxial with the longitudinal axis 10 of tool head 1. The end of tool head 1 that is opposite shank 3 is configured as a cutting tool having a chip-forming face 9. Shank 3 has a short conical portion 3a, a cylindrical pin portion 3b, and a guide portion 3c at the end. Shank 3 further includes an annular abutment collar 5. Tool holder 2 includes an exchangeable receiving sleeve 11, and when tool head 1 and tool holder 2 are in their tensioned state, as illustrated in FIG. 1, abutment collar 5 is pressed against end 20 of sleeve 11 to provide frontal support. End 20 serves as an abutment surface. A retaining means such as key 6 is provided for indexing the tool head 1. Key 6 protrudes from the cylindrical pin portion 3b so as to engage in a corresponding groove or keyway 21 in sleeve 11 of tool holder 2. For an automatic tool head exchange, a circumferential V-shaped groove 7 is provided in the region of the largest diameter of tool head 1 next to abutment collar 5 to accommodate gripping devices (not illustrated).

Sleeve 11 has a receiving bore 4 with portions 4a, 4b, and 4c which are configured to accommodate shank 3. The exchangeable receiving sleeve 11 can be adapted to different machine conditions, but it will be apparent that sleeve 11 could be omitted if bore 4 were provided directly in tool holder 2. The first portion 4a of receiving bore 4 is conical. This conical portion 4a is followed by a coaxial cylindrical portion 4b whose diameter is larger than the smallest diameter of conical portion 3a. Bore 4 ends in a conical guide portion 4c having the same cone angle as the first portion 4a and having a planar face 14 disposed perpendicularly to the common longitudinal axis 10 of tool head 1 and tool holder 2. This planar face 14 is the bottom of bore 4, at which an elastically deformable ring 16 is provided.

Conical portion 4a of tool holder 2 and guide portion 3c at the end of shank 4 are elastically deformable, the elastic deformability is limited essentially to these regions. Significant losses with respect to the rigidity of tool head 1 or the tool coupling are not encountered. An axial undercut 15 at the end of shank 3 provides an elastically deformable annular wall 26, thereby making conical guide portion 3c elastically deformable. Furthermore sleeve 11 of tool holder 2 projects outward beyond frontal face 25 to provide an elastically deformable wall 27, thereby making conical portion 4a elastically deformable and having a thickness of 3 to 20% of the outer diameter of the abutment collar 5.

To tension the tool head 1, there is provided, for example, a differentially threaded screw 8 guided in a central threaded bore 12 provided at the end of shank 3 as well as in a threaded bore 13 in tool holder 2. The term "differentially threaded" means that screw 8 has a first threaded portion 23 which is configured to engage bore 12 and a second threaded portion 24, with a different pitch, which is configured to engage bore 13, the threads of both portions of screw 8 spiral in the same direction, but the thread of the first portion 23 has a smaller pitch than the thread of the second portion 24. It should also be noted that the diameter of the first portion 23 is sufficiently smaller than the diameter of the second portion 24 that the first portion 23 can be moved through bore 13 without engaging the threads thereof.

FIG. 2 illustrates tool head 1 in its released state. If differentially threaded screw 8 is tightened, it engages shank 3 and then begins pulling shank 3 into bore 4 at a rate corresponding to the difference in the thread pitches. As the tightening of screw 8 continues, conical portion 3a of shank 3 elastically deforms conical portion 4a of bore 4 outward and conical portion 4c elastically deforms conical portion 3c inward. Finally, the annular planar face of abutment collar 5 comes in contact with end 20 of tool holder 2, so that tool head 1 and tool holder 2 are in their tensioned state as illustrated in FIG. 1.

When the tool head 1 is inserted, the end of its shank 3 abuts against the elastically deformable ring 16 at the bottom 14 of bore 4, which produces preliminary positioning. Then the clamping device (not shown) is actuated and the differentially threaded screw 8 is screwed in as previously described so as to pull the tool head 1 inward, which compresses abutment 16. In addition to its preliminary positioning function, ring 16 keeps shank 3 from hitting screw 8 and damaging the threads when a new tool head 1 is being installed.

To return tool head 1 and tool holder 2 to the untensioned state shown in FIG. 2, differentially threaded screw 8 is screwed out of the threaded bore 12 of shank 3, which slightly moves the tool head 1 and the shank 3 outward. The released tool head 1 can now be easily removed from the tool holder 2 through V-groove 7 by means of a gripper device (not illustrated).

Figure 3:
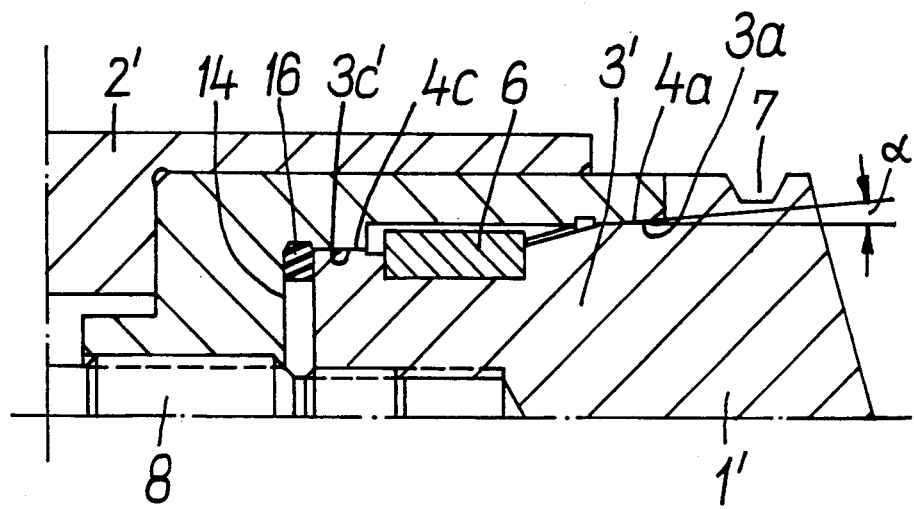
FIG. 3 is a cross-sectional view illustrating another embodiment of the invention, and shows a tool head and a tool holder in the tensioned state, the tool head having a shank with a cylindrical guide portion rather than a conical portion at its end.

While FIGS. 1 and 2 show a tool head 1 having a shank 3 with two short conical portions 3a and 3c and a cylindrical pin portion 3b disposed therebetween, FIG. 3 shows an embodiment of tool head 1' and tool holder 2' wherein the guide portion 3c' at the end of shank 3' is not conical but cylindrical.

In principle, the angles for the conical portions 3a or 3c may lie within the limits customarily used for steep angle tapered shafts. They may also be unequal. In the present case, however, the slope angle $\alpha$ of the portion 3a is approximately 6°, as is the slope angle $\beta$ of the portion 3c.

Figure 4:
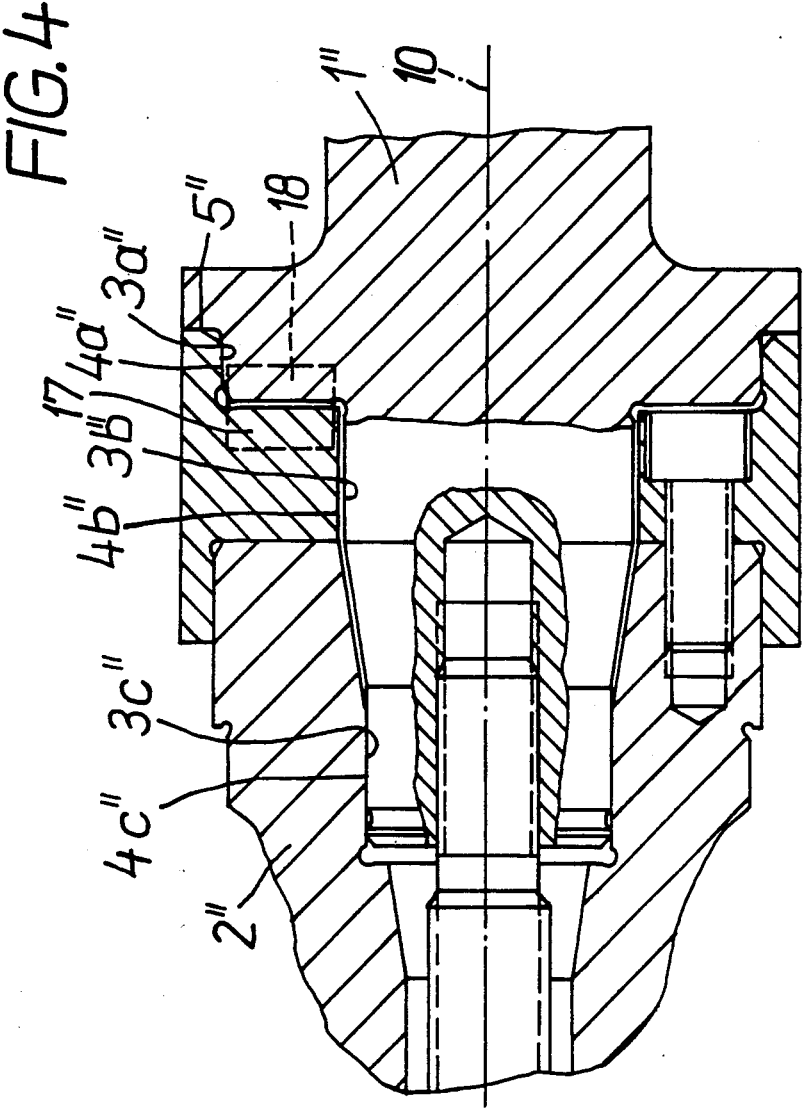
FIG. 4 is a cross-sectional view illustrating a tool head and a tool holder with retaining means at its frontal face.

In lieu of a retaining mean in the form of a longitudinally extending key 6 at the central pin portion 3b and a corresponding keyway 21 in portion 4b of bore 4, radially extending locking formations may be provided for instance between portions 3a, 4c and 3a, 4c. Another retaining mean is shown conceptually in FIG. 4, where a radially extending key 17 is mounted on tool holder 2" to engage a corresponding keyway 18 in tool head 1". Tool holder 2", which has a recess with portions 4a", 4b", and 4c", and tool head 1", which has a collar 5" and a shank with portions 3a", 3b", and 3c", provide another embodiment of the present invention.

Figure 5:
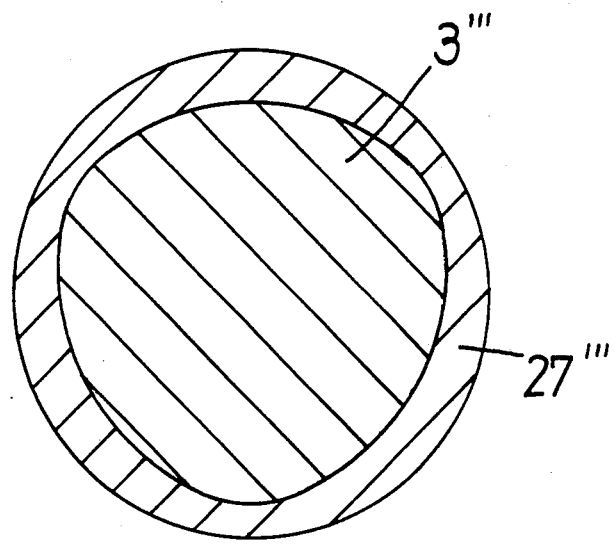
FIG. 5 is a sectional view of an advantageously polygonal connection between the tool head and the tool holder.

In the further modification illustrated in FIG. 5, wall 27''' of the sleeve of the tool holder and shank 3''' of the tool head may have non-circular cross sectional configurations as illustrated to provide a generally polygonal connection which prevents rotation of the tool head.

It will be understood that the above description of the present invention is susceptible to various modifications, changes and adaptations, and the same are intended to be comprehended within the meaning and range of equivalents of the appended claims.

What I claim is:

1. A tool coupling for securing a cutting tool against rotation and axial distortion, comprising:
    a tool head having a cutting edge, said tool head additionally having an abutment collar and having a shank with a free end, said shank being provided with a first conical portion adjacent said abutment collar, a guide portion at said free end of said shank, and an intermediate pin portion between said conical portion and said guide portion; and
    a tool holder having an abutment surface for planar engagement with said abutment collar and having a bore for receiving said shank, said bore having a first conical portion that is positioned to engage said first conical portion of said shank, said first conical portion of said shank being dimensioned so that at least one of said first conical portions is elastically distorted when said shank is forced into said bore, the elastic deformation bringing said abutment collar of said tool head into planar contact with said abutment surface of said tool holder, said bore additionally having a guide portion and an intermediate portion which is positioned between said first conical portion of said bore and said guide portion of said bore, said guide portion of said bore being in contact with said guide portion of said shank and said intermediate portion of said bore being spaced apart from said intermediate pin portion of said shank when said abutment collar of said tool head is in planar contact with said abutment collar of said tool holder.

2. The tool coupling of claim 1, wherein said guide portion of said shank has a cylindrical shape.

3. The tool coupling of claim 2, wherein said guide portion of said bore is a cylindrical portion that is positioned to engage said guide portion of said shank, said cylindrical portion of said bore being dimensioned to receive said guide portion of said shank within close tolerances.

4. The tool coupling of claim 1, wherein said guide portion of said shank comprises a second conical portion.

5. The tool coupling of claim 4, wherein said guide portion of said bore is a second conical portion that is positioned to engage said second conical portion of said shank, said second conical portion of said shank being elastically deformable and being dimensioned so that said second conical portion of said shank is compressed when said shank is forced into said bore.

6. The tool coupling of claim 5, wherein only said first conical portion of said bore and said second conical portion of said shank are elastically deformable.

7. The tool coupling of claim 6, wherein said first conical portion of said shank has a slope angle and said second conical portion of said shank has a slope angle, said slope angles being substantially equal.

8. The tool coupling of claim 7, wherein said slope angles are selected in the range of from about one degree to about ten degrees.

9. The tool coupling of claim 8, wherein said shank has an axis and an axially disposed threaded recess, wherein said bore has an axis and said tool holder has a threaded recess disposed along the bore axis, and further comprising means for forcing said shank into said bore, said means for forcing comprising a differentially threaded screw having a portion to engage said threaded recess of said shank and another portion to engage said threaded recess of said tool holder.

10. The tool coupling of claim 1, wherein said bore has an axis and a keyway parallel to said axis, and further comprising retaining means for securing said tool head against rotation, said retaining means comprising a key disposed on said intermediate pin portion of said shank at a position to engage said keyway.

11. The tool coupling of claim 1, wherein said abutment collar of said tool head is annular and has a center, wherein said shank has an axis that extends through said center of said abutment collar, wherein said abutment surface of said tool holder is annular and has a center, wherein said bore has an axis which runs through said center of said abutment surface, wherein one of said abutment collar and said abutment surface has a keyway that extends radially of the respective axis, and further comprising retaining means for securing said tool head against rotation, said retaining means comprising a key disposed on the other of said abutment collar and said abutment surface at a position to engage said keyway.

12. The tool coupling of claim 1, further comprising retaining means for securing said tool head against rotation, said retaining means being provided by a polygonal connection between said tool head and said tool holder.

13. The tool coupling of claim 1, wherein said tool holder comprises an exchangeable sleeve and a mounting element having an opening therein to at least partially receive said sleeve, said bore being provided in said sleeve.

14. The tool coupling of claim 1, wherein said bore has a bottom, and further comprising an elastically deformable abutment at said bottom of said bore.

15. The tool coupling of claim 1, wherein said intermediate pin portion of said shank is cylindrical.

* * * * *